US012812048B2

(12) United States Patent
Ichinowatari et al.

(10) Patent No.: US 12,812,048 B2
(45) Date of Patent: Nov. 24, 2026

(54) IMAGE PROCESSING APPARATUS, NON-TRANSITORY COMPUTER READABLE MEDIUM STORING PROGRAM, AND IMAGE PROCESSING METHOD THAT DISPLAY GUIDANCE INFORMATION FOR DOCUMENT PLACEMENT

(71) Applicant: FUJIFILM Business Innovation Corp., Tokyo (JP)

(72) Inventors: Yasushi Ichinowatari, Kanagawa (JP); Kaho Kamiya, Kanagawa (JP); Mitsuharu Ito, Kanagawa (JP); Shigeki Katayama, Kanagawa (JP); Koichiro Takagishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/188,482

(22) Filed: Mar. 23, 2023

(65) Prior Publication Data

US 2024/0089384 A1 Mar. 14, 2024

(30) Foreign Application Priority Data

Sep. 13, 2022 (JP) ................................ 2022-145652

(51) Int. Cl.
*H04N 1/00* (2006.01)

(52) U.S. Cl.
CPC ......... *H04N 1/0049* (2013.01); *H04N 1/0044* (2013.01); *H04N 1/00474* (2013.01); *H04N 1/00689* (2013.01); *H04N 1/00702* (2013.01); *H04N 1/00737* (2013.01); *H04N 1/00758* (2013.01); *H04N 1/00771* (2013.01); *H04N 1/00782* (2013.01)

(58) Field of Classification Search
CPC ............... H04N 1/0049; H04N 1/0044; H04N 1/00474; H04N 1/00681–00782
See application file for complete search history.

(56) References Cited

U.S. PATENT DOCUMENTS

2007/0076268 A1 4/2007 Shojo et al.
2010/0103474 A1* 4/2010 Oiwa .................. H04N 1/1017 715/764

(Continued)

FOREIGN PATENT DOCUMENTS

JP 2003018369 1/2003
JP 2010021830 1/2010

(Continued)

OTHER PUBLICATIONS

"Search Report of Europe Counterpart Application", issued on Jan. 5, 2024, pp. 1-11.

(Continued)

*Primary Examiner* — Nicholas Pachol
(74) *Attorney, Agent, or Firm* — JCIPRNET

(57) ABSTRACT

An image processing apparatus includes a placement unit that is provided on an upper surface of a housing and on which a document is placed; an imaging unit that images the placement unit from above; and a processor configured to display guidance information indicating that the document to be imaged by the imaging unit is to be placed on the placement unit, on a display unit.

11 Claims, 13 Drawing Sheets

(56) References Cited

U.S. PATENT DOCUMENTS

| | | | | |
|---|---|---|---|---|
| 2012/0001999 | A1* | 1/2012 | Schirdewahn | H04N 7/142<br>348/E7.083 |
| 2013/0135654 | A1* | 5/2013 | Imamura | H04N 1/0044<br>358/1.13 |
| 2016/0255212 | A1* | 9/2016 | Kato | H04N 1/00352<br>358/488 |
| 2016/0295051 | A1* | 10/2016 | Dandoko | H04N 1/00745 |
| 2017/0244850 | A1* | 8/2017 | Ishitori | H04N 1/00702 |
| 2017/0244853 | A1* | 8/2017 | Yabuuchi | H04N 1/00708 |
| 2017/0374210 | A1* | 12/2017 | Channa | G06F 21/608 |
| 2018/0183952 | A1* | 6/2018 | Imaoka | H04N 1/00411 |
| 2018/0367694 | A1 | 12/2018 | Asakawa et al. | |
| 2019/0058804 | A1* | 2/2019 | Zhang | H04N 1/0417 |
| 2020/0047513 | A1 | 2/2020 | Arakane et al. | |
| 2020/0137233 | A1* | 4/2020 | Wilson | H04N 1/00411 |
| 2021/0218853 | A1* | 7/2021 | Saeda | H04N 1/00424 |

FOREIGN PATENT DOCUMENTS

| | | |
|---|---|---|
| JP | 2015212892 | 11/2015 |
| JP | 2018014604 | 1/2018 |

OTHER PUBLICATIONS

Innovatrics., "Document auto capture for web and mobile components", The Wayback Machine [online], Aug. 11, 2022, pp. 1-5. Available at: https://web.archive.org/web/20220811201627/https://developers.innovatrics.com/digital-onboarding/docs/functionalities/document/auto-capture/.

"Notice of Reasons for Refusal of Japan Counterpart Application", issued on Aug. 4, 2026, with English translation thereof, p. 1-p. 9.

"Office Action of Europe Counterpart Application", issued on Jul. 29, 2026, p. 1-p. 7.

* cited by examiner

IMAGE PROCESSING APPARATUS, NON-TRANSITORY COMPUTER READABLE MEDIUM STORING PROGRAM, AND IMAGE PROCESSING METHOD THAT DISPLAY GUIDANCE INFORMATION FOR DOCUMENT PLACEMENT

CROSS-REFERENCE TO RELATED APPLICATIONS

This application is based on and claims priority under 35 USC 119 from Japanese Patent Application No. 2022-145652 filed Sep. 13, 2022.

BACKGROUND

(i) Technical Field

The present invention relates to an image processing apparatus, a non-transitory computer readable medium storing a program, and an image processing method.

(ii) Related Art

JP2003-018369A describes a document camera that images a document placed on a platen by an imaging unit.

SUMMARY

As image processing apparatuses such as multifunction machines, for example, an image processing apparatus in which a document placed on a placement unit such as a top plate of a housing is imaged by an imaging unit disposed above the placement unit has been proposed.

As described above, in a case where a part of the outer surface of the housing is a placement unit for a document, the user may not know whether to place the document on the placement unit.

Aspects of non-limiting embodiments of the present disclosure relate to an image processing apparatus, a non-transitory computer readable medium storing a program, and an image processing method that capable of making a user recognize that a document is to be placed on a placement unit.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image processing apparatus including: a placement unit that is provided on an upper surface of a housing and on which a document is placed; an imaging unit that images the placement unit from above; and a processor configured to: display guidance information indicating that the document to be imaged by the imaging unit is to be placed on the placement unit, on a display unit.

BRIEF DESCRIPTION OF THE DRAWINGS

Exemplary embodiment(s) of the present invention will be described in detail based on the following figures, wherein:

FIG. 1A is a side view of the image forming apparatus and FIG. 1B is a front view of the image forming apparatus;

DETAILED DESCRIPTION

Figure 1B:
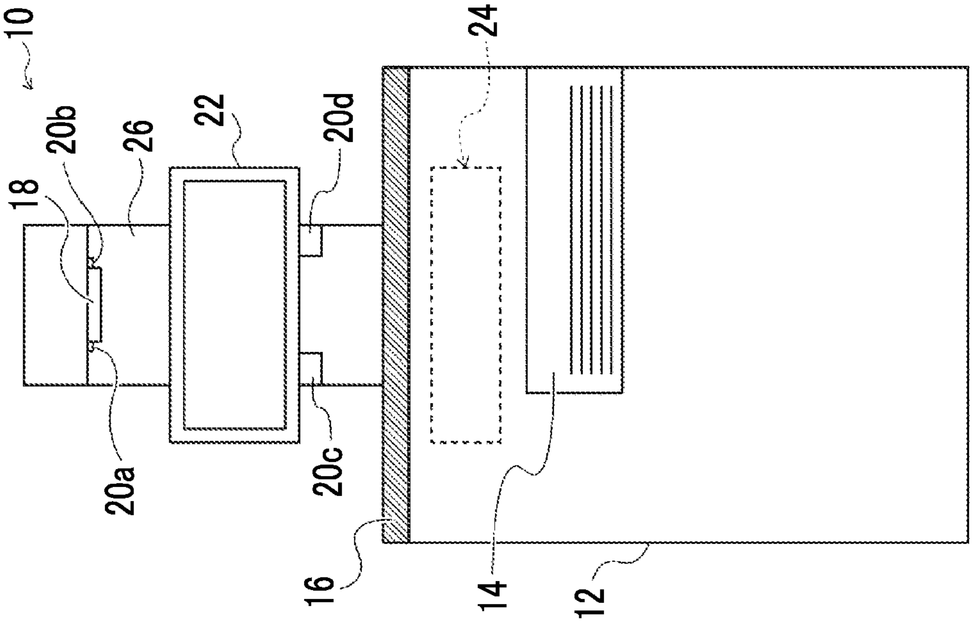
FIGS. 1A and 1B are views showing an external appearance of an image forming apparatus according to an exemplary embodiment of the present invention, where
Figure 1A:
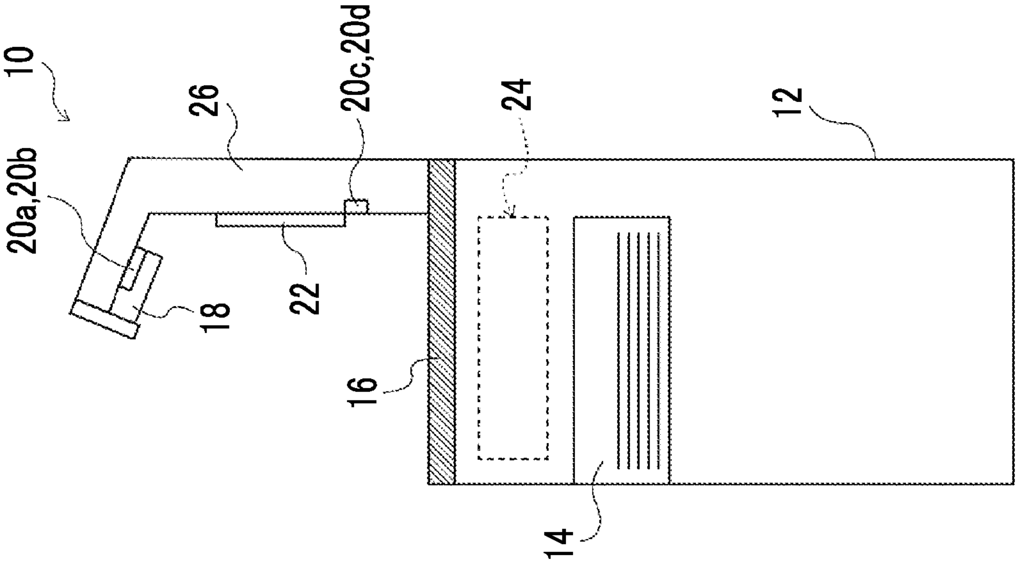
Figure 2:
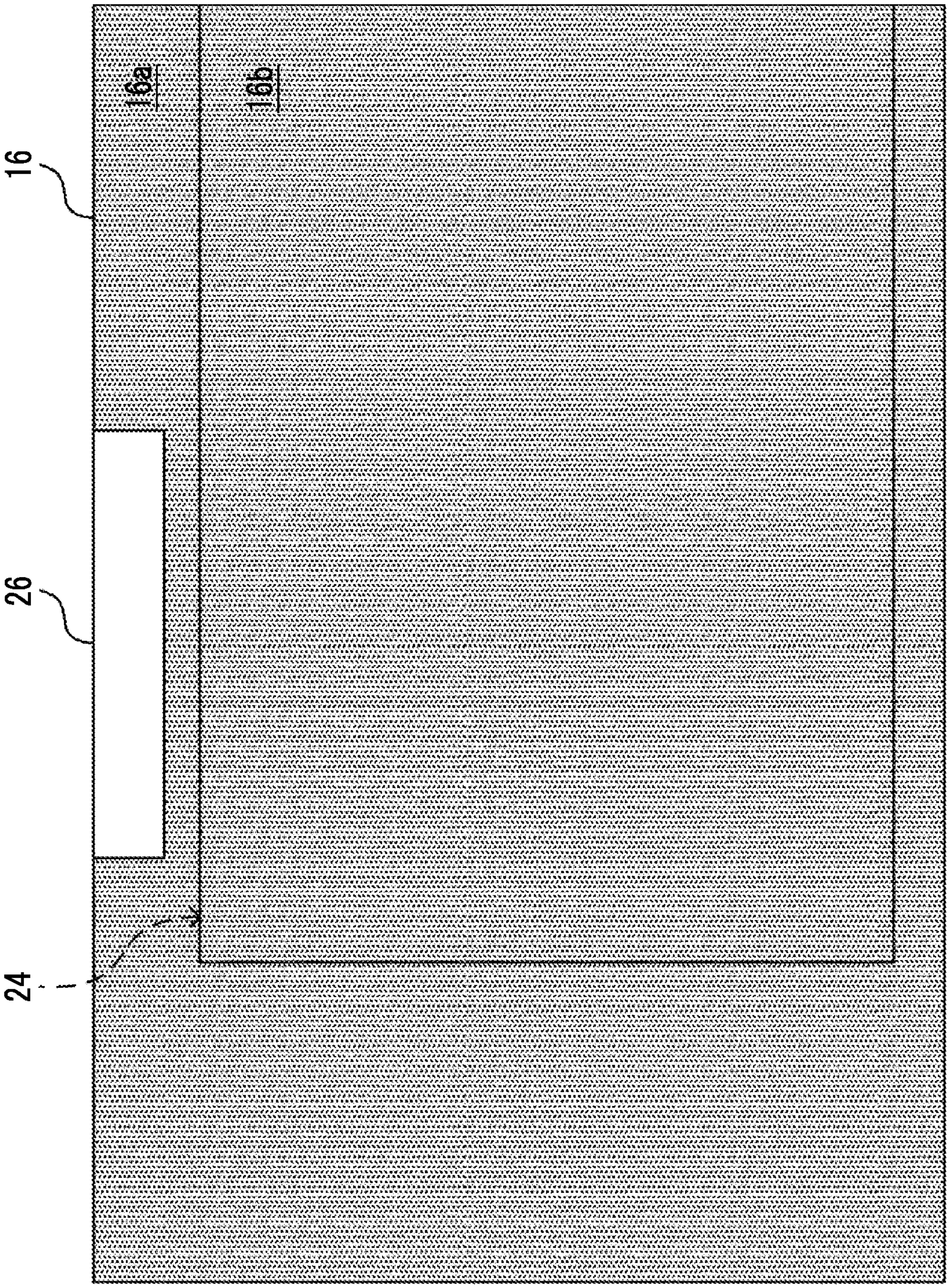
FIG. 2 is a top view showing the appearance of the placement unit, and is a view showing a state in which a document scanning device is not used.
Figure 3:
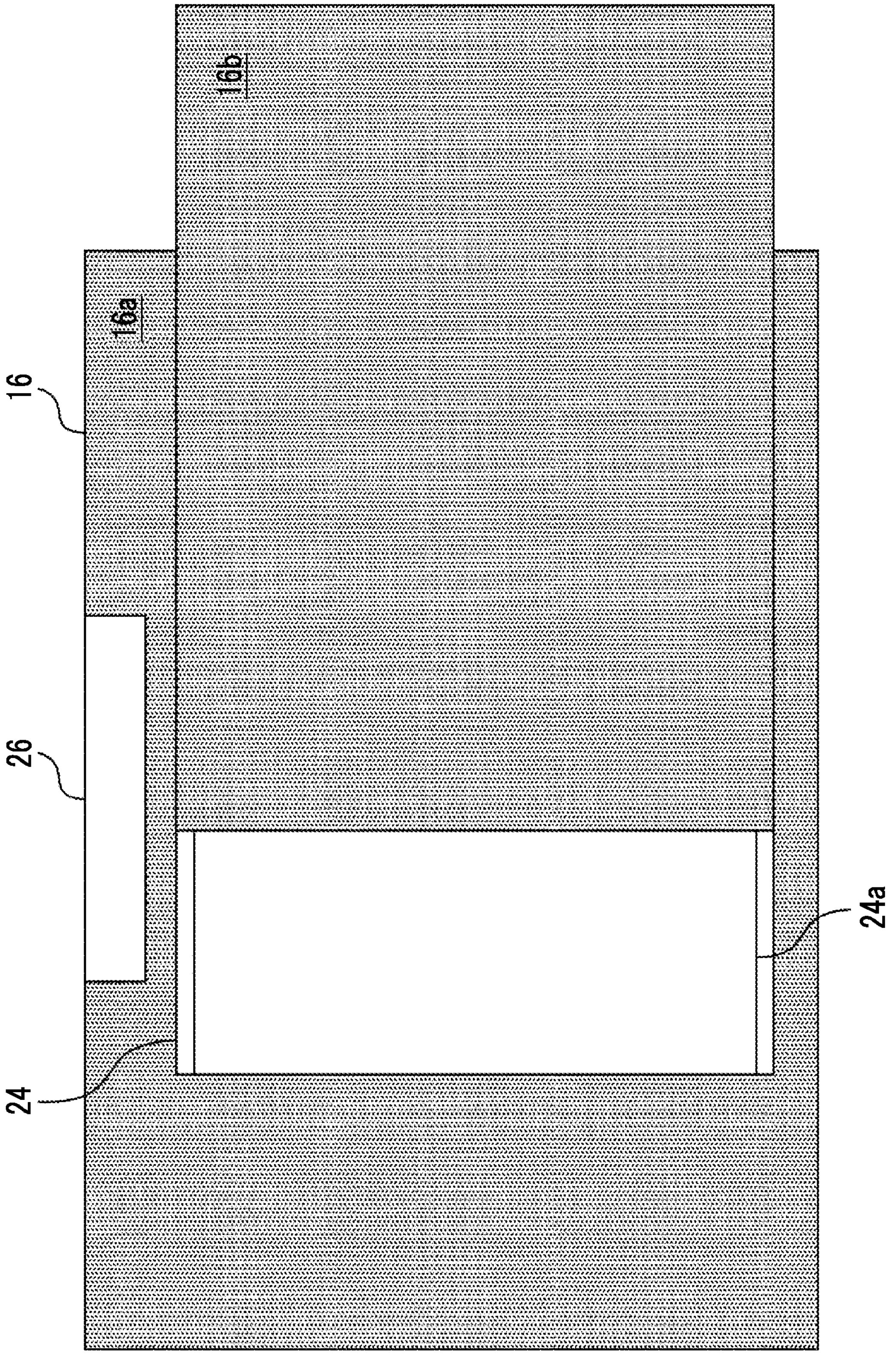
FIG. 3 is a top view showing the appearance of the placement unit, and is a view showing a state in which the document scanning device can be used.

Hereinafter, an exemplary embodiment of the present invention will be described in detail with reference to the accompanying drawings. FIGS. 1A and 1B are views showing an external appearance of an image forming apparatus 10 as an example of an image processing apparatus according to an exemplary embodiment of the present invention, where FIG. 1A is a side view of the image forming apparatus 10 and FIG. 1B is a front view of the image forming apparatus 10. FIG. 2 is a top view showing the appearance of the placement unit 16, and is a view showing a state in which the document scanning device 24 is not used. FIG. 3 is a top view showing the appearance of the placement unit 16, and is a view showing a state in which the document scanning device 24 can be used. In addition, the image forming apparatus 10 is an apparatus installed in an office such as a multifunction machine.

As shown in FIGS. 1A and 1B, the image forming apparatus 10 includes an apparatus body 12, a discharge tray 14 as a medium discharge unit, a placement unit 16, an imaging device 18, an irradiation device 20 including four light sources 20*a*, 20*b*, 20*c*, and 20*d*, an operation panel 22, a document scanning device 24, or the like.

The discharge tray 14 is where paper, which is an example of a medium, is discharged. Further, the discharge tray 14 is provided at a position where the medium is taken out by the user in a standing state.

The placement unit 16 is a top surface of the apparatus body 12, and is disposed on an upper portion of the apparatus body 12. Further, the placement unit 16 is installed above the discharge tray 14 in the vertical direction. Further, the document scanning device 24 is provided in the apparatus body 12 below the top plate 16*a* of the placement unit 16.

As shown in FIG. 2, the top plate 16*a* of the placement unit 16 is configured such that a document such as a paper, a business card, or a receipt can be placed. Further, as shown in FIG. 3, the document scanning device 24 is configured to be able to be used by sliding a part of the sliding portion 16*b* of the top plate 16*a* of the placement unit 16 toward the outside in the plane direction.

The document scanning device 24 includes a document feeding mechanism, a scanner, or the like. The document scanning device 24 slides the sliding portion 16*b* toward the outside in the plane direction to read-in the document placed on the exposed document placement unit 24*a* into the inside of the device and scan the document. The document scanning device 24 may also scan both sides of the document at the same time.

The imaging device 18 includes an imaging element such as a charge coupled device (CCD), for example, and images a subject such as a document to acquire image data. The imaging device 18 is installed above the placement unit 16, and is configured to image the document placed on the placement unit 16 from above. Here, in a case where the upper surface of the placement unit 16 is used as the reference plane, the term "above the placement unit 16" is not limited to the position vertically above the reference plane, and means a position that is above in the vertical direction and is higher than the reference plane.

Further, a column 26 is provided on the top surface of the apparatus body 12 and on the back of the upper surface of the placement unit 16. The column 26 extends upward substantially perpendicular to the upper surface of the placement unit 16, and is provided with an end portion bent above the placement unit 16. The imaging device 18 is attached to an end portion of the column 26.

An image forming unit, which forms an image of a subject placed on the placement unit 16, is provided between the discharge tray 14 and the placement unit 16. That is, an image forming unit that forms an image on the paper discharged to the discharge tray 14 is provided above the discharge tray 14.

The irradiation device 20 includes one or more light sources such as, for example, a light emitting diode (LED), and includes, for example, the light sources 20*a*, 20*b*, 20*c*, and 20*d*. The light sources 20*a*, 20*b*, 20*c*, and 20*d* are provided on the column 26. That is, the light sources 20*a*, 20*b*, 20*c*, and 20*d* are provided above the placement unit 16.

Specifically, the light sources 20*a* and 20*b* are provided in the vicinity of the imaging device 18, downward on both sides of the imaging device 18 of the column 26. The light sources 20*c* and 20*d* are provided in the vicinity of the operation panel 22, obliquely downward on both sides of the column 26 at the lower end of the operation panel 22.

That is, the light sources 20*a* and 20*b* and the light sources 20*c* and 20*d* are arranged at positions with different heights from the placement unit 16. That is, the light sources 20*a*, 20*b*, 20*c*, and 20*d* are disposed at positions where the angles of light hitting the subject are different from each other, and are configured to irradiate the document with light from different directions. Thereby, the discriminability between the document and the placement unit 16 is improved.

The operation panel 22 includes a display screen, and is configured to set the image forming apparatus 10. The operation panel 22 is installed on the column 26 between the placement unit 16 and the imaging device 18, at the back of the apparatus body 12.

Figure 4:
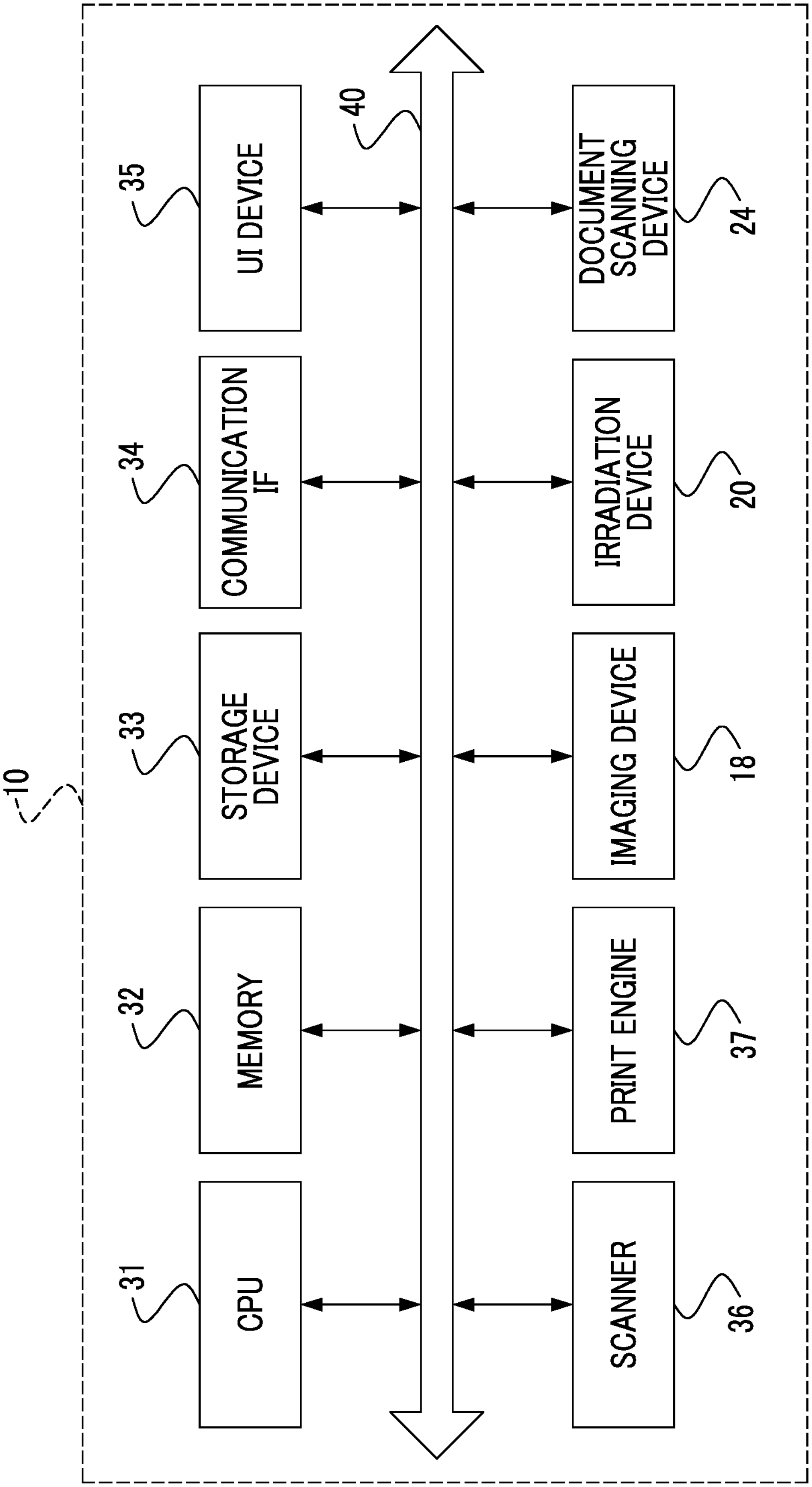
FIG. 4 is a block diagram showing a hardware configuration of the image forming apparatus.

Next, the hardware configuration of the image forming apparatus 10 of the present exemplary embodiment will be described. FIG. 4 is a block diagram showing a hardware configuration of the image forming apparatus 10.

As shown in FIG. 4, the image forming apparatus 10 includes a CPU 31, a memory 32, a storage device 33 such as a hard disk drive, a communication interface (abbreviated as IF) 34 that transmits and receives data to and from an external device or the like via a network, a user interface (abbreviated as UI) device 35 including a touch panel or a liquid crystal display, and a keyboard, a scanner 36, a print engine 37, the imaging device 18, the irradiation device 20, and the document scanning device 24. These components are connected to each other via the control bus 40.

The communication IF 34 transmits and receives data to and from an external device or the like. The UI device 35 receives an instruction input from the user. The scanner 36 scans the document loaded in the image forming apparatus 10 as image data. The print engine 37 prints an image on a recording medium such as printing paper through steps such as charging, exposure, development, transfer, and fixing.

The CPU 31 is a processor that controls the operation of the image forming apparatus 10 by executing a predetermined process based on a control program stored in the memory 32 or the storage device 33. In the present exemplary embodiment, it has been described that the CPU 31 reads and executes the control program stored in the memory 32 or the storage device 33, but the present invention is not limited thereto. The control program may be provided in a form recorded on a computer-readable recording medium. For example, this program may be provided in the form recorded on an optical disk such as a compact disc (CD)-read only memory (ROM) and a digital versatile disc (DVD)-ROM, or the form recorded on a semiconductor memory such as a universal serial bus (USB) memory and a memory card. Further, the control program may be acquired from an external device via a communication line connected to the communication IF 34.

Figure 5:
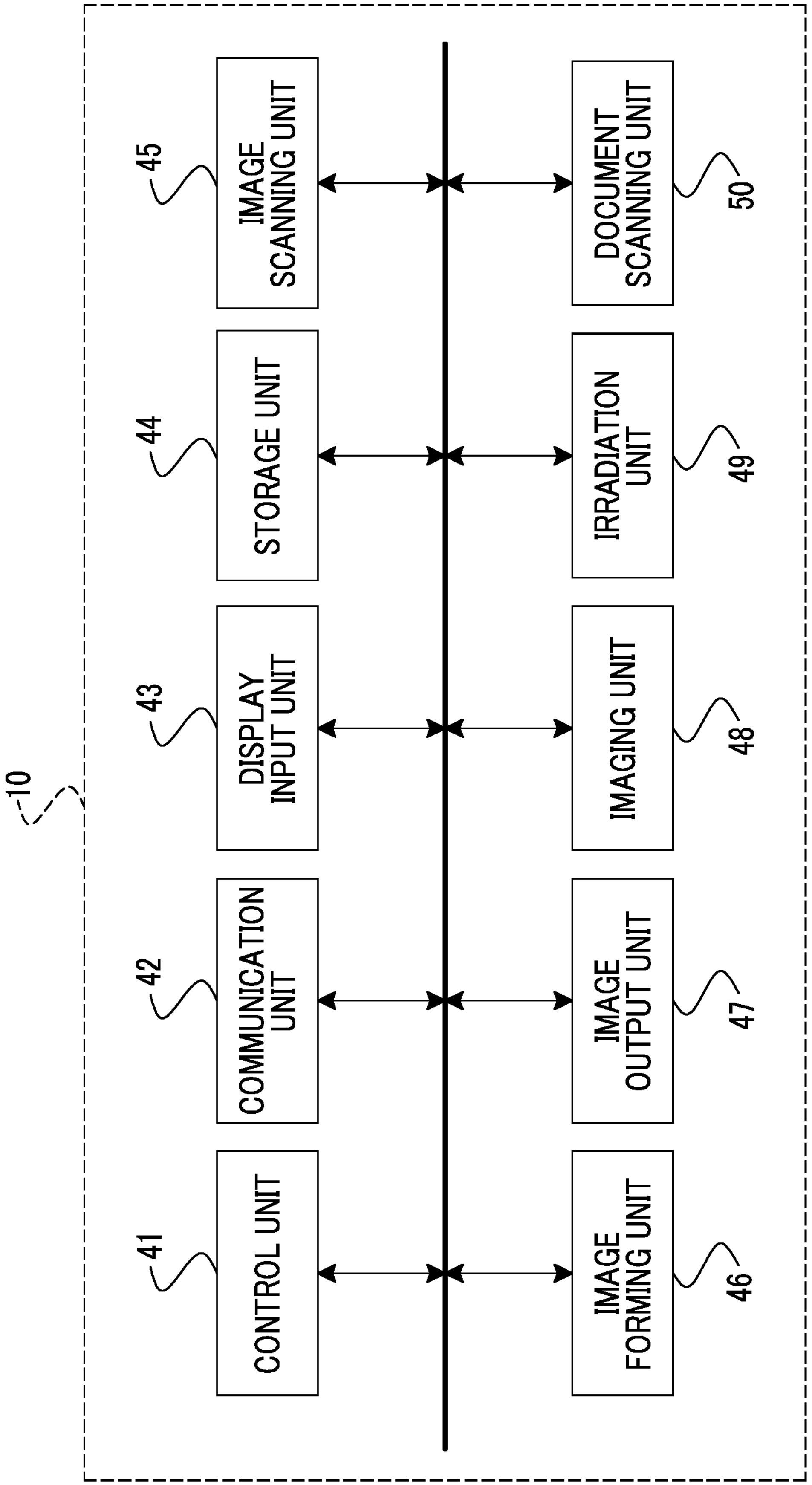
FIG. 5 is a block diagram showing a functional configuration of the image forming apparatus.

Next, the functional configuration of the image forming apparatus 10 of the present exemplary embodiment will be described. FIG. 5 is a block diagram showing a functional configuration of the image forming apparatus 10.

As shown in FIG. 5, the image forming apparatus 10 includes a control unit 41, a communication unit 42, a display input unit 43, a storage unit 44, an image scanning unit 45, an image forming unit 46, an image output unit 47, an imaging unit 48, an irradiation unit 49, and a document scanning unit 50.

The control unit 41 controls the overall operation of the image forming apparatus 10, and in addition to controlling the light emission of the document scanning device 24, for example, based on an instruction input from the user, performs control of imaging the document by the imaging device 18, control of outputting printing data such as a document image by the image output unit 47, or the like.

The communication unit 42 transmits and receives data to and from an external device. The display input unit 43 displays various types of information on the display screen of the operation panel 22, based on the control by the control unit 41. Further, the display input unit 43 inputs various types of operation information performed by the user on the operation panel 22. The operation panel 22 configuring the display input unit 43 is an example of the display unit in the technique of the present disclosure. The storage unit 44 stores various types of data such as image data generated by the control unit 41 in addition to the control program.

The image scanning unit 45 performs a scanning operation of scanning various documents, based on the control by the control unit 41. The image forming unit 46 forms an image to be output from the image output unit 47, based on the control by the control unit 41. The image output unit 47 outputs the image formed by the image forming unit 46 onto a recording medium such as printing paper, based on the control by the control unit 41. The image output unit 47 is an example of a document output unit in the technique of the present disclosure.

The imaging unit 48 images the document placed on the placement unit 16 by using the imaging device 18. The irradiation unit 49 illuminates the placement unit 16 by using the irradiation device 20. The document scanning unit 50 automatically scans the document placed on the placement unit 16 by using the document scanning device 24.

The control unit 41 of the present exemplary embodiment displays, the operation panel 22, guidance information 60 indicating that the document to be imaged by the imaging device 18 is placed on the placement unit 16, in order to make the user recognize that the document is to be placed on the placement unit 16.

Figure 6:
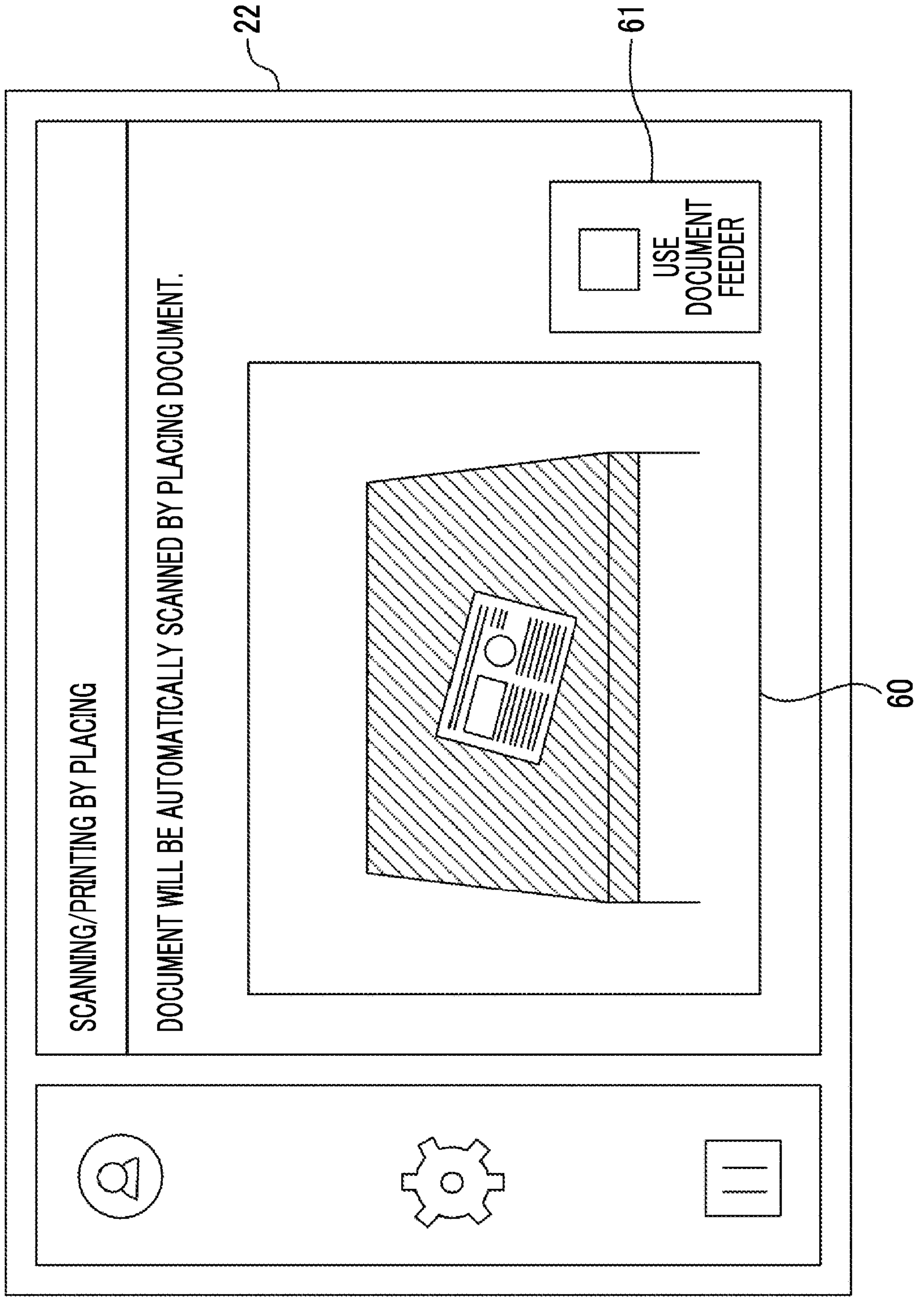
FIG. 6 is a diagram showing an example of a guidance screen.

FIG. 6 is a diagram showing an example of the guidance information 60 displayed on the operation panel 22. The guidance information 60 may have any form as long as it includes information indicating that the document is to be placed on the placement unit 16. As an example, in the example shown in FIG. 6, the guidance information 60 in text such as "The document will be automatically scanned by placing a document." and the guidance information 60 in a figure indicating that the document is to be placed in the placement unit 16 are shown.

In the present exemplary embodiment, the guidance information 60 may include information on the orientation in a case where the document is placed. Here, the "orientation in a case where the document is placed" includes information such as the orientation of the surface of the document to be imaged, and the orientation of the upper side of the image obtained by capturing the document.

These pieces of information may be displayed as either a text or an illustration, or both may be displayed in combination. In the example shown in FIG. 6, a figure indicating that the document is placed with the imaging surface facing the front side and the upper side of the document facing the back side of the apparatus is shown. That is, it is shown that the surface of the original document to be imaged is the front side, and the orientation of the image of the document, which is the upper side of the image, is the back side of the apparatus.

The control unit 41 may display, on the operation panel 22, a button 61 which is an operator for transitioning to a selection screen for selecting a function to be used, from among functions including at least one of a function of using the imaging unit 48, a function of using the document scanning unit 50, a function of using the image output unit 47, a function of setting the image processing apparatus, or a function of editing the destination table, together with the guidance information 60.

Figure 7:
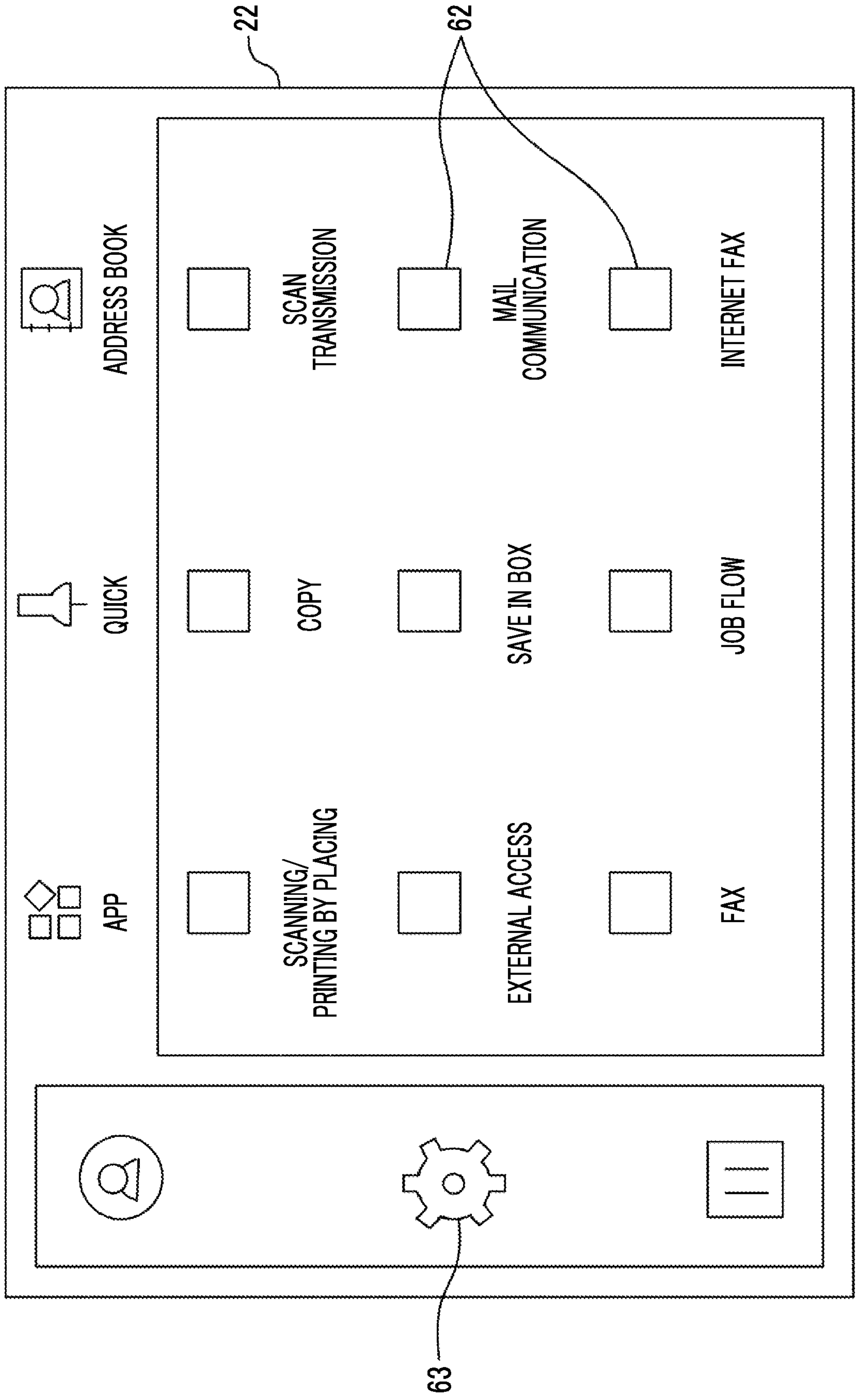
FIG. 7 is a diagram showing an example of a selection screen.

FIG. 7 is a diagram showing an example of a selection screen displayed on the operation panel 22. The selection screen includes a plurality of buttons 62 for selecting a function to be used. As an example, the example shown in FIG. 7 includes buttons 62 such as "scanning/printing by placing", "copy", "scan transmission", "external access", "save in box", "mail communication", "fax", "job flow", "Internet fax", "app", "quick", and "address book". Further, buttons to which various functions are assigned, such as a setting button 63, are included.

Here, "scanning/printing by placing" is a function of automatically imaging and printing a document placed on the placement unit 16, and is a function of using the imaging unit 48 and the image output unit 47. Further, the "copy" is a function of scanning and printing a document placed on the placement unit 16 by the document scanning device 24, and is a function of using the document scanning unit 50 and the image output unit 47. The "address book" is a function of editing a destination table. Further, the setting button 63 is a button for selecting a function for setting the image processing apparatus.

In a case where the selection screen includes a function of using the imaging unit 48, the control unit 41 may display the guidance information 60 on the display unit, in a case where the function of using the imaging unit 48 (in the example shown in FIG. 6, "scanning/printing by placing") is selected on the selection screen.

Further, the control unit 41 controls the imaging unit 48 to image the document, without receiving an instruction from the user, in a case where the position of the document placed on the placement unit 16 does not change for a set time or more.

The following aspect can be used as an aspect of automatically performing imaging in a case where the position of the document placed on the placement unit 16 does not change for a set time or more. For example, the imaging may be performed after performing the countdown in a case where the position of the document placed on the placement unit 16 does not change for a set time or more. Further, the imaging may be immediately performed in a case where the position of the document placed on the placement unit 16 does not change for a set time or more.

Figure 8:
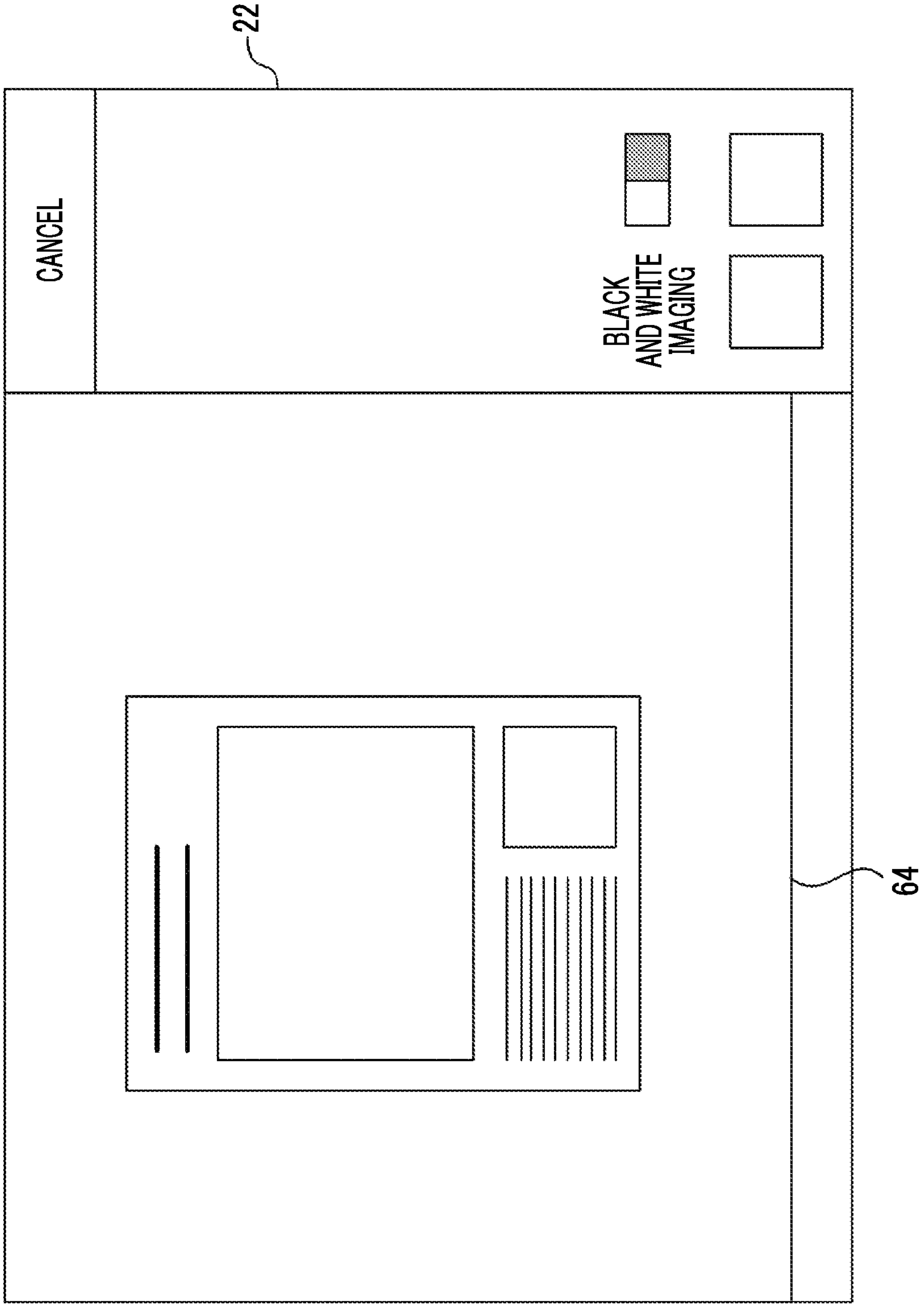
FIG. 8 is a diagram showing an example of a live view screen.
Figure 9:
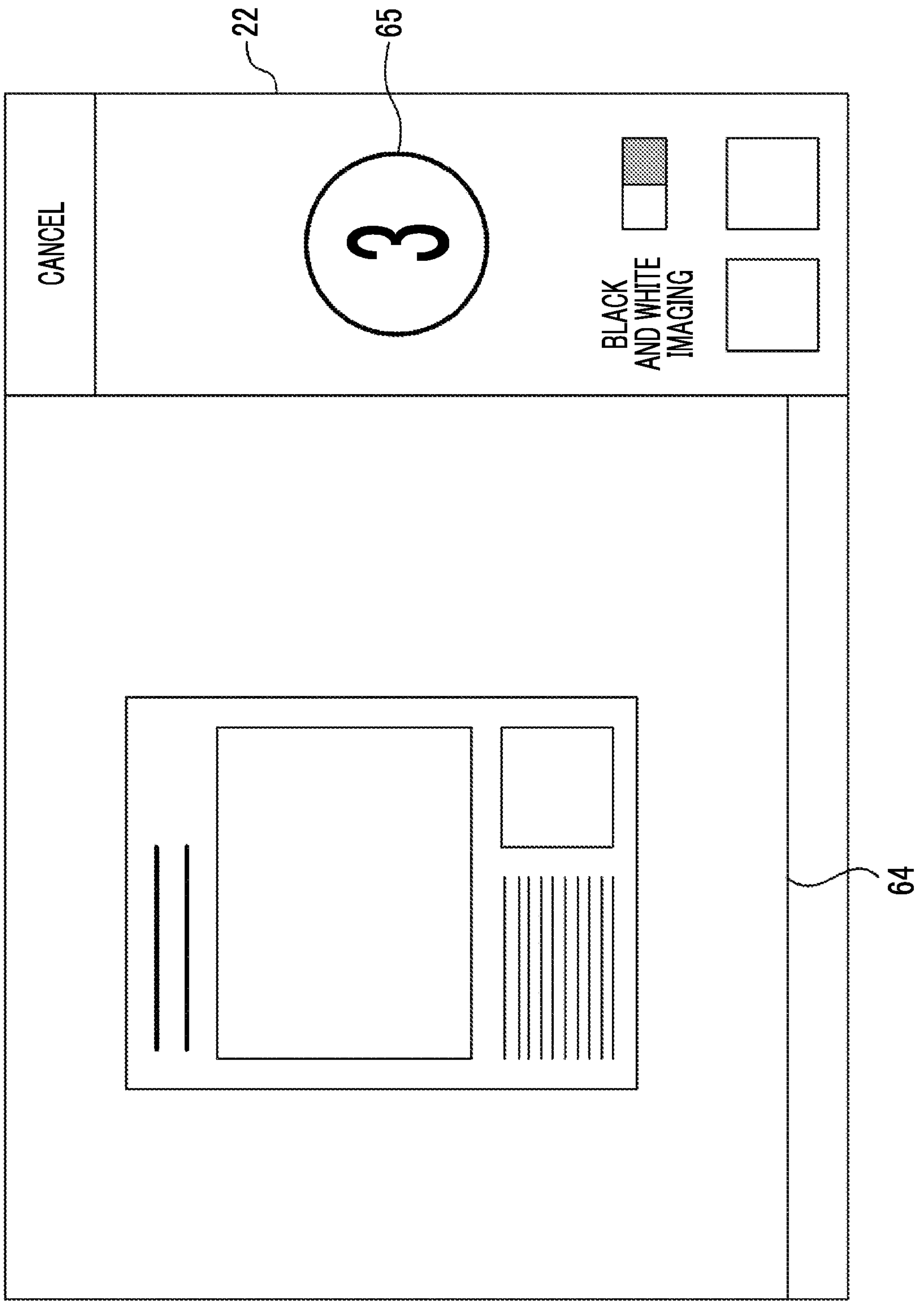
FIG. 9 is a diagram (1) showing an example of a countdown screen.
Figure 10:
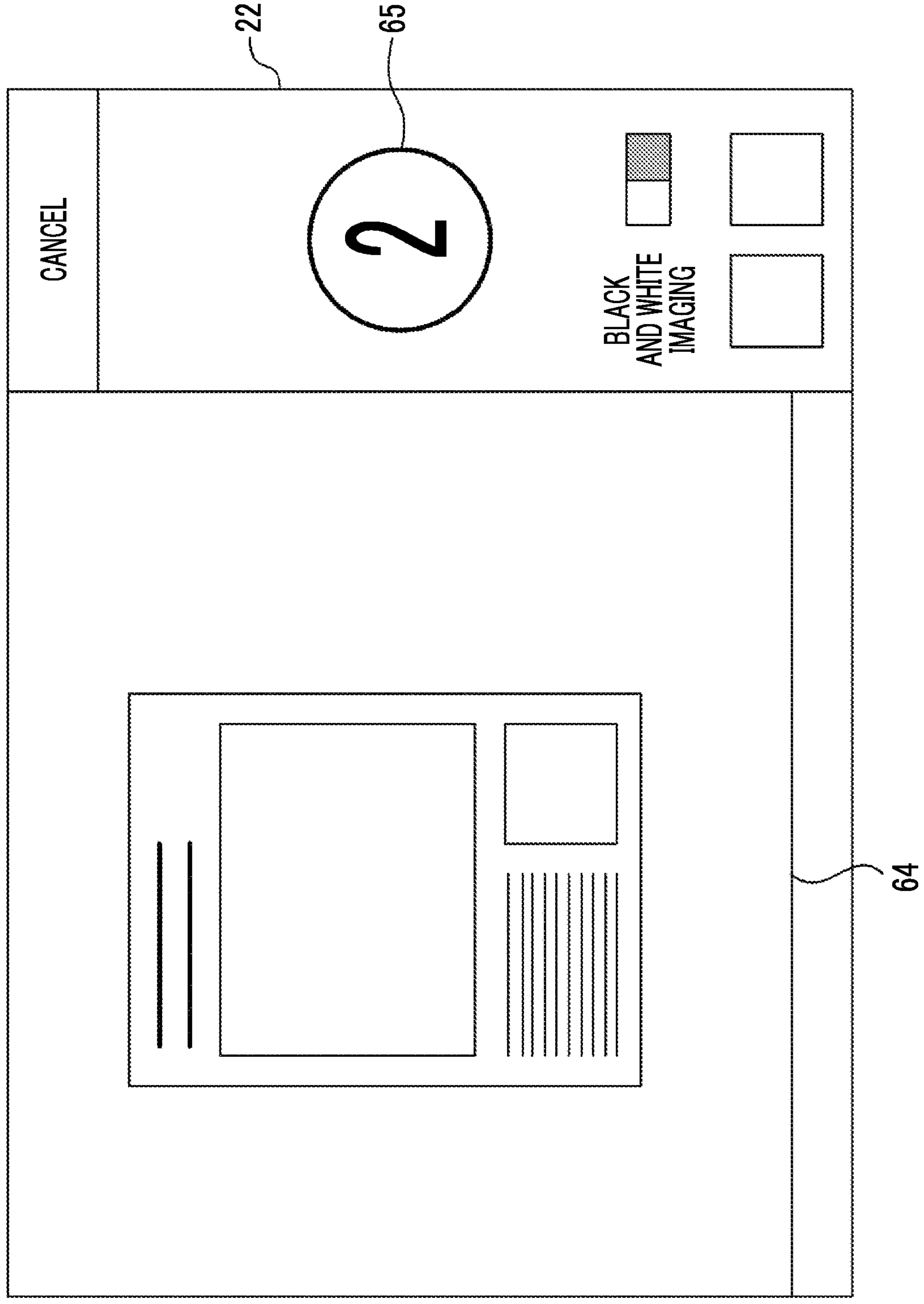
FIG. 10 is a diagram (2) showing an example of the countdown screen.
Figure 11:
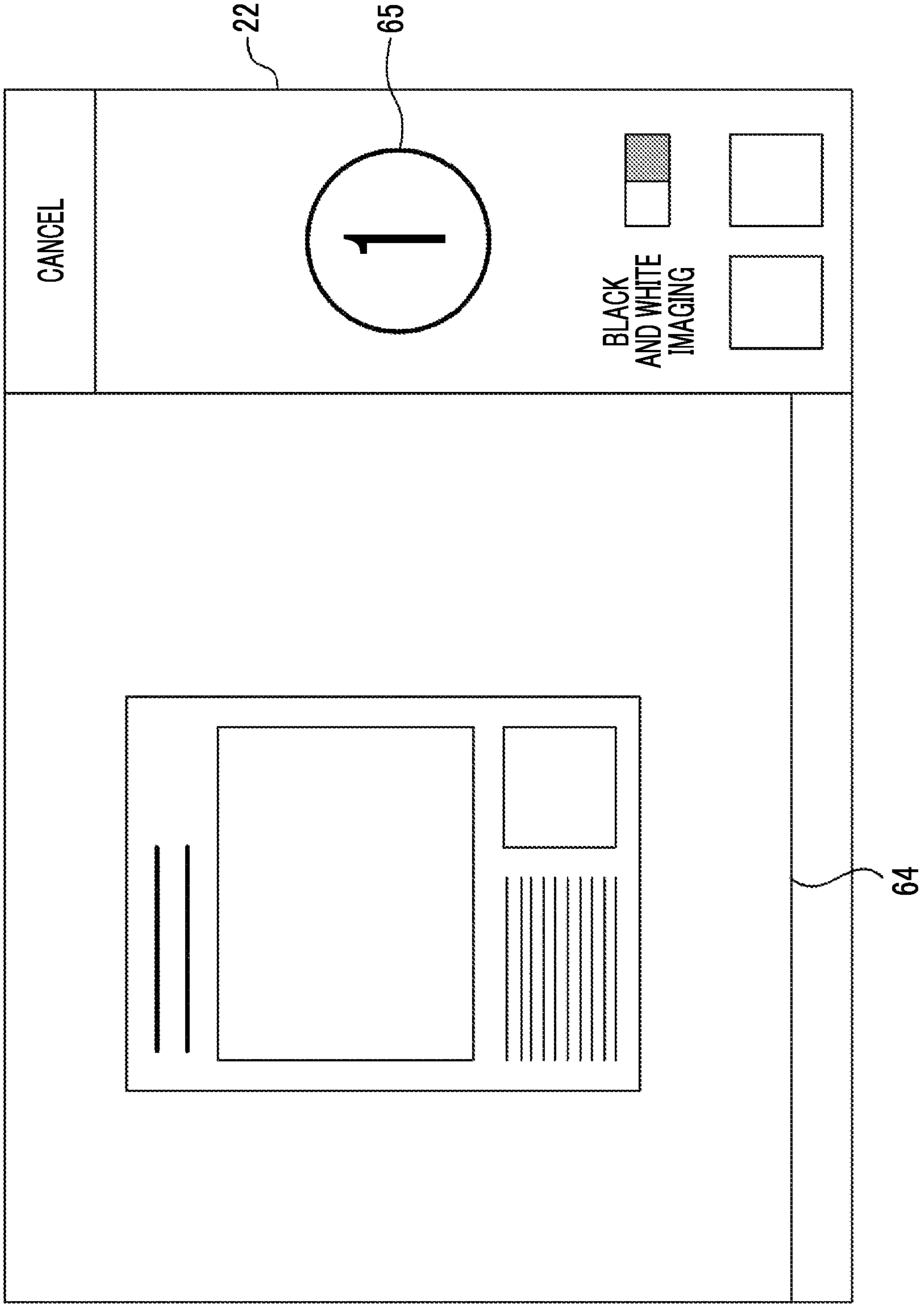
FIG. 11 is a diagram (3) showing an example of the countdown screen.
Figure 12:
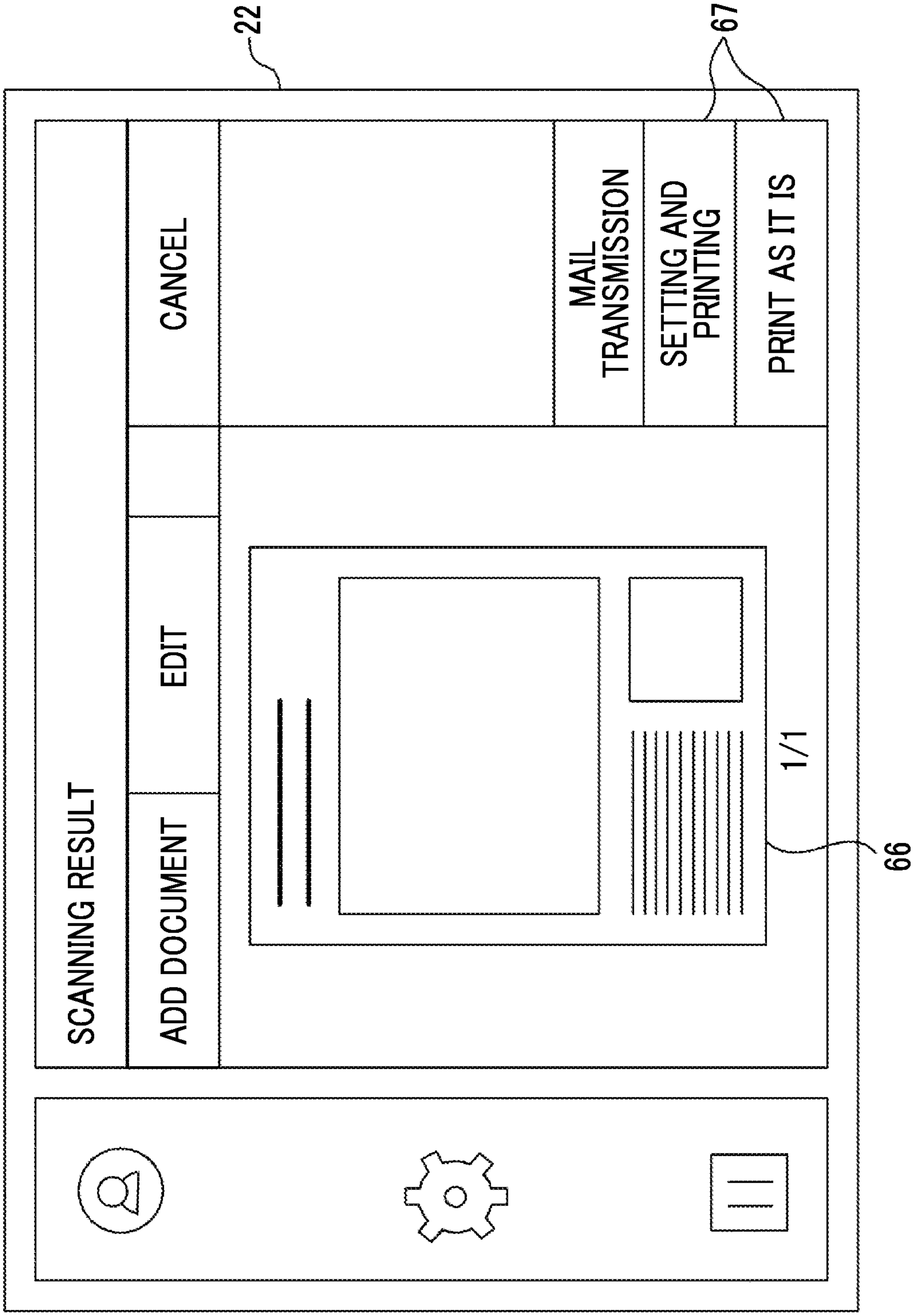
FIG. 12 is a diagram showing an example of a preview screen.

In the present exemplary embodiment, as an example of the function of performing such imaging, as shown in the selection screen of FIG. 7, the "scanning/printing by placing" is illustrated. Here, the process of "scanning/printing by placing" will be described in detail. FIG. 8 is a diagram showing an example of a live view screen displayed on the operation panel 22. FIGS. 9 to 11 are diagrams illustrating an example of a countdown screen displayed on the operation panel 22. FIG. 12 is a diagram showing an example of a preview screen displayed on the operation panel 22.

In a case where "scanning/printing by placing" is selected, the control unit 41 displays the guidance information 60 on the operation panel 22 as shown in FIG. 6. In this state, in a case where it is detected that the document has been placed on the placement unit 16, the control unit 41 displays the live view screen on the operation panel 22, as shown in FIG. 8. The live view screen is a screen displaying a live view image 64 that is an image representing a current state imaged by the imaging unit 48.

In a case where the position of the document placed on the placement unit 16 does not change for a set time or more, the control unit 41 displays a countdown screen on the operation panel 22 as shown in FIG. 9. In the present example, the countdown screen is a screen in which a countdown timer 65 is also displayed next to the live view image 64.

Further, in the present example, as shown in FIG. 9, the countdown is set to 3 seconds, and the control unit 41 counts down by 1 second as shown in FIGS. 10 and 11, and in a case where the time reaches 0 second, the control unit 41 captures an image.

After capturing an image, the control unit 41 displays a preview screen on the operation panel 22 as shown in FIG. 12. The preview screen is a screen on which the image 66 of the document imaged by the imaging unit 48 is displayed. Further, the preview screen includes various buttons 67 that are an operator for instructing transmission of an email, an operator for instructing setting and printing, and an operator for instructing printing as it is. In a case where the various buttons 67 are selected on the preview screen, the control unit 41 performs the process of the selected buttons.

The control unit 41 may change the time until the document is imaged since the document is placed on the placement unit 16, in response to an instruction from the user. Here, the "time until the document is imaged since the document is placed on the placement unit 16" will be described.

As described above, in a case where the imaging is performed after performing the countdown in a case where the position of the document placed on the placement unit 16 does not change for a set time or more, any one of a time to the start of the countdown since the position of the document placed on the placement unit 16 is fixed and the time of the countdown may be changed, or both times may be changed.

Further, in a case where the imaging is immediately performed in a case where the position of the document placed on the placement unit 16 does not change for a set time or more, a time to the start of the imaging since the position of the document placed on the placement unit 16 is fixed may be changed.

Further, in a case where the guidance information 60 as shown in FIG. 6 is displayed on the operation panel 22, the control unit 41 may detect whether or not the document has been placed on the placement unit 16, by using an image captured by the imaging unit 48, that is, a live view image.

In this case, in a case where the document has been placed on the placement unit 16, the control unit 41 may stop displaying the guidance information 60 on the operation panel 22, and display the live view screen as shown in FIG. 8 on the operation panel 22.

Further, in a case where the selection screen as shown in FIG. 7 is displayed on the operation panel 22, the control unit 41 may stop the detection of whether or not the document has been placed on the placement unit 16. In this case, the control unit 41 may stop the operation of the imaging unit 48 while the detection is stopped.

Figure 13:
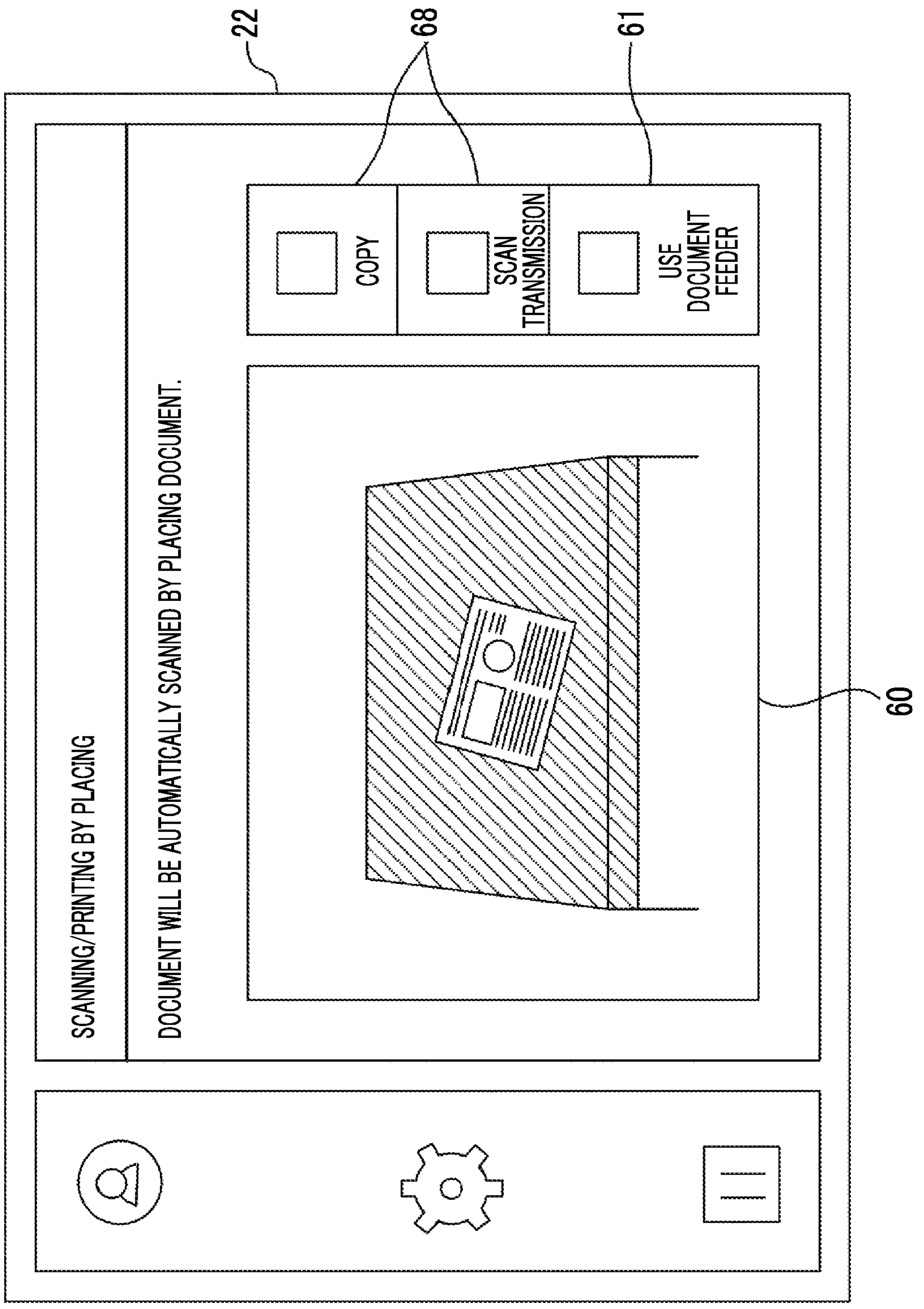
FIG. 13 is a diagram showing another example of the guidance screen.

Further, as shown in FIG. 13, the control unit 41 may display an operator for executing the function on the operation panel 22 together with the guidance information 60. In the example shown in FIG. 13, various buttons 68 that are operators for executing the function are displayed.

Further, the control unit 41 may first display the guidance information 60 or the selection screen on the operation panel 22, in at least one situation among after start-up of the image processing apparatus, after return from the power saving state of the image processing apparatus, or after authentication of a user who uses the image processing apparatus.

Modification Example

Although the image forming apparatus according to the exemplary embodiment of the present invention has been described above, the present invention is not limited to the above exemplary embodiment and may be appropriately modified.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, in the above exemplary embodiment, the case where the present invention is applied to the multifunction machine as the image forming apparatus has been described, but the present invention is not limited thereto, and the present invention can also be applied to various types of image processing apparatuses such as a scanner.

Supplementary Notes

Hereinafter, aspects of the present disclosure will be described.

(((1)))

An image processing apparatus comprising:

a placement unit that is provided on an upper surface of a housing and on which a document is placed;

an imaging unit that images the placement unit from above; and a processor configured to:

display guidance information indicating that the document to be imaged by the imaging unit is to be placed on the placement unit, on a display unit.

(((2)))

The image processing apparatus according to (((1))), wherein the guidance information includes information on an orientation in a case where the document is placed.

(((3)))

The image processing apparatus according to (((1))) or (((2))), wherein the processor is configured to:

display, on the display unit, an operator for transitioning to a selection screen for selecting a function to be used, from among functions including at least one of a function of using the imaging unit, a function of using a document scanning unit, a function of using a document output unit, a function of setting the image processing apparatus, or a function of editing a destination table, together with the guidance information.

(((4)))

The image processing apparatus according to (((3))), wherein a function that is to be selected on the selection screen includes the function of using the imaging unit, and the processor is configured to:

display the guidance information on the display unit, in a case where the function of using the imaging unit is selected on the selection screen.

(((5)))

The image processing apparatus according to any one of (((1))) to (((4))), wherein the processor is configured to:

control the imaging unit to image the document, without receiving an instruction from a user, in a case where a position of the document placed on the placement unit does not change for a set time or more.

(((6)))

The image processing apparatus according to (((5))), wherein the processor is configured to:

change a time until the document is imaged since the document is placed on the placement unit, in response to an instruction from the user.

(((7)))

The image processing apparatus according to any one of (((1))) to (((6))), wherein the processor is configured to:

detect whether or not the document is placed on the placement unit, by using an image captured by the imaging unit, in a case where the guidance information is displayed on the display unit.

(((8)))

The image processing apparatus according to (((7))), wherein the processor is configured to:

stop displaying the guidance information on the display unit, and display an image representing a current state captured by the imaging unit, on the display unit, in a case where the document is placed on the placement unit.

(((9)))

The image processing apparatus according to (((7))) or (((8))), wherein the processor is configured to:

stop detection of whether or not the document is placed on the placement unit, in a case where a selection screen for selecting a function to be used is displayed on the display unit.

(((10)))

The image processing apparatus according to (((9))), wherein the processor is configured to:

stop an operation of the imaging unit while the detection is stopped.

(((11)))

The image processing apparatus according to any one of (((1))) to (((10))), wherein the processor is configured to:

display an operator for executing a function, on the display unit, together with the guidance information.

(((12)))

The image processing apparatus according to any one of (((1))) to (((11))), wherein the processor is configured to:

first display, on the display unit, the guidance information or a selection screen for selecting a function to be used, in at least one situation among after start-up of the image processing apparatus, after return from a power saving state of the image processing apparatus, or after authentication of a user who uses the image processing apparatus.

(((13)))

A program for controlling an image processing apparatus including a placement unit that is provided on an upper surface of a housing and on which a document is placed, an imaging unit that images the placement unit from above, and a processor, the program causing a computer to execute a process comprising:

displaying guidance information indicating that the document to be imaged by the imaging unit is to be placed on the placement unit, on a display unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:

a housing;

a placement unit that is provided on a top surface of the housing and on which a document is placed;

a column that is provided on the top surface of the housing and on a rear edge of an upper surface of the placement unit;

an imaging unit that comprises a charge coupled device installed above the placement unit and configured to image the placement unit from above, wherein the imaging unit is attached to an end portion of the column;

an operation panel that includes a display and input screen and that is installed on the column between the placement unit and the imaging unit and is configured to receive an instruction from a user through the display and input screen; and a processor configured to:

display guidance information on the operation panel to indicate that the document to be imaged by the imaging unit is to be placed on the placement unit;

display an operator for executing a function, on the operation panel, together with the guidance information;

detect whether or not the document is placed on the placement unit, by using an image captured by the imaging unit, in a case where the guidance information is displayed on the operation panel; and stop displaying the guidance information on the operation panel, and display an image representing a current state captured by the imaging unit, on the operation panel, in a case where the document is detected to be placed on the placement unit.

2. The image processing apparatus according to claim 1, wherein the guidance information includes information on an orientation in a case where the document is placed.

3. The image processing apparatus according to claim 1, wherein the operator comprises an operator for transitioning to a selection screen for selecting a function to be used, from among functions including at least one of a function of using the imaging unit, a function of using a document scanning unit, a function of using a document output unit, a function of setting the image processing apparatus, or a function of editing a destination table, together with the guidance information.

4. The image processing apparatus according to claim 3, wherein a function that is to be selected on the selection screen includes the function of using the imaging unit, and the processor is configured to:

display the guidance information on the operation panel, in a case where the function of using the imaging unit is selected on the selection screen.

5. The image processing apparatus according to claim 1, wherein the processor is configured to:

control the imaging unit to image the document, without receiving an instruction from the user, in a case where a position of the document placed on the placement unit does not change for a set time or more.

6. The image processing apparatus according to claim 5, wherein the processor is configured to:

change a time until the document is imaged since the document is placed on the placement unit, in response to an instruction from the user.

7. The image processing apparatus according to claim 1, wherein the processor is configured to:

stop detection of whether or not the document is placed on the placement unit, in a case where a selection screen for selecting a function to be used is displayed on the operation panel.

8. The image processing apparatus according to claim 7, wherein the processor is configured to:

stop an operation of the imaging unit while the detection is stopped.

9. The image processing apparatus according to claim 1, wherein the processor is configured to:

first display, on the operation panel, the guidance information or a selection screen for selecting a function to be used, in at least one situation among after start-up of the image processing apparatus, after return from a power saving state of the image processing apparatus, or after authentication of the user who uses the image processing apparatus.

10. A non-transitory computer readable medium storing a program for controlling an image processing apparatus including a housing, a placement unit that is provided on a top surface of the housing and on which a document is placed, a column that is provided on the top surface of the housing and on a rear edge of an upper surface of the placement unit, an imaging unit that images the placement unit from above, an operation panel that includes a display and input screen, and a processor, wherein the imaging unit is attached to an end portion of the column, and the operation panel is installed on the column between the placement unit and the imaging unit and is configured to receive an instruction from a user through the display and input screen, the non-transitory computer readable medium storing the program causing a computer to execute a process comprising:

displaying guidance information on the operation panel to indicate that the document to be imaged by the imaging unit is to be placed on the placement unit;

displaying an operator for executing a function, on the operational operation panel, together with the guidance information;

detecting whether or not the document is placed on the placement unit, by using an image captured by the imaging unit, in a case where the guidance information is displayed on the operation panel; and stopping displaying the guidance information on the operation panel, and displaying an image representing a current state captured by the imaging unit, on the operation panel, in a case where the document is detected to be placed on the placement unit.

11. An image processing method for controlling an image processing apparatus including a housing, a placement unit that is provided on a top surface of the housing and on which a document is placed, a column that is provided on the top surface of the housing and on a rear edge of an upper surface of the placement unit, an imaging unit that images the placement unit from above, an operation panel that includes a display and input screen, and a processor, wherein the imaging unit is attached to an end portion of the column, and the operation panel is installed on the column between the placement unit and the imaging unit and is configured to receive an instruction from a user through the display and input screen, the method comprising:

displaying guidance information on the operation panel to indicate that the document to be imaged by the imaging unit is to be placed on the placement unit;

displaying an operator for executing a function, on the operation panel, together with the guidance information;

detecting whether or not the document is placed on the placement unit, by using an image captured by the imaging unit, in a case where the guidance information is displayed on the operation panel; and stopping displaying the guidance information on the operation panel, and displaying an image representing a current state captured by the imaging unit, on the operation panel, in a case where the document is detected to be placed on the placement unit.

* * * * *